United States Patent [19]

Sakuragi et al.

[11] Patent Number: 4,572,609
[45] Date of Patent: Feb. 25, 1986

[54] COOLING MECHANISM FOR OPTICAL FIBER

[75] Inventors: Shiro Sakuragi; Mitsunori Saitoh, both of Kyoto; Haruo Kotani, Osaka; Kyoshiro Imagawa, Kyoto, all of Japan

[73] Assignee: Agency of Industrial Science & Technology, Tokyo, Japan

[21] Appl. No.: 679,105

[22] Filed: Dec. 7, 1984

Related U.S. Application Data

[63] Continuation of Ser. No. 396,472, Jul. 8, 1982, abandoned.

[30] Foreign Application Priority Data

Jul. 10, 1981 [JP]  Japan ............................... 56-107139

[51] Int. Cl.⁴ ........................................... G02B 5/172
[52] U.S. Cl. .............................. 350/96.30; 350/96.29; 350/96.32
[58] Field of Search ............... 350/96.10, 96.24, 96.29, 350/96.30, 96.31, 96.32; 372/6, 34, 35

[56] References Cited

U.S. PATENT DOCUMENTS

| | | | |
|---|---|---|---|
| 4,038,650 | 7/1977 | Evans et al. | 350/96.26 X |
| 4,325,006 | 4/1982 | Morton | 372/35 X |
| 4,381,141 | 4/1983 | Sakuragi et al. | 350/96.34 |
| 4,398,789 | 8/1983 | Pryor | 350/96.15 X |

FOREIGN PATENT DOCUMENTS

| | | | |
|---|---|---|---|
| 1184028 | 3/1970 | United Kingdom | 350/96.29 |
| 1189265 | 4/1970 | United Kingdom | 350/96.32 |
| 2004081 | 3/1979 | United Kingdom | 350/96.32 |

*Primary Examiner*—William L. Sikes
*Assistant Examiner*—Akm E. Ullah
*Attorney, Agent, or Firm*—Wenderoth, Lind & Ponack

[57] ABSTRACT

A mechanism for cooling optical fibers which include optical fibers, metal netting wound around the fibers to conduct heat therefrom, and a sheath in which the fibers and netting are inserted. In accordance with one embodiment, the sheath and netting are spaced from each other so as to permit cooling air to flow therebetween to cool the fibers. In another embodiment, the netting is connected to a cooler by a heat connected element so that heat in the fibers is drawn to the cooler through the heat conductive element to cool the fibers.

8 Claims, 2 Drawing Figures

COOLING MECHANISM FOR OPTICAL FIBER

This application is a continuation of now abandoned application Ser. No. 396,472 filed July 8, 1982.

BACKGROUND OF THE INVENTION

1. Field of the Invention

The present invention relates to a mechanism for cooling optical fibers.

2. Description of the Prior Art

As for optical fibers, in particular optical fibers for transmitting highpower laser rays and the like, it is indispensable to cool the optical fibers in order to maintain the appointed functions and lengthen the span of life thereof. The conventional cooling mechanism of this type has the defects that it is complicated in structure, bulky and expensive.

SUMMARY OF THE INVENTION

The present invention was achieved in consideration of the above described defects. It is an object of the present invention to provide a cooling mechanism, which is suitably used with optical fibers for transmitting mainly highpower infrared laser rays, for effectively cooling said fibers using a simple structure.

DESCRIPTION OF THE PREFERRED EMBODIMENTS

Now the preferred embodiments of the present invention will be described by reference to the drawings.

Figure 1:
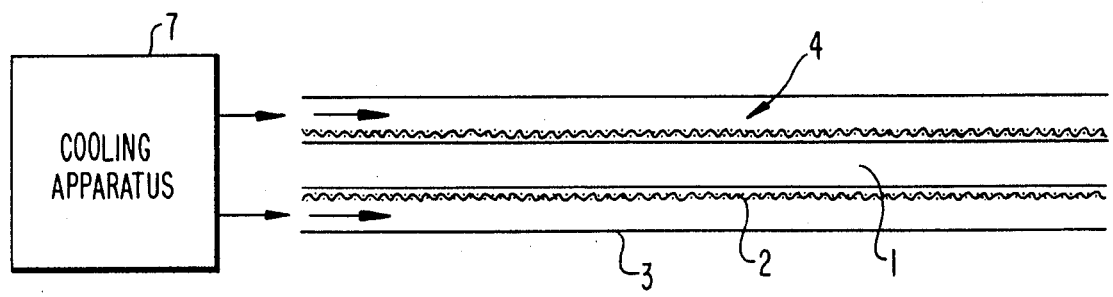
FIG. 1 is a side sectional view showing one preferred embodiment of a mechanism for cooling optical fibers according to the present invention.

Referring now to FIG. 1 showing one preferred embodiment of the present invention, reference numeral 1 denotes optical fibers (for example infrared fibers), reference numeral 2 designating heat conductive armour materials, for example metal nets, wound around said fibers 1 on the periphery thereof, and reference numberal 3 designating a sheath made, for example, of synthetic resin, in which said optical fibers wound with said armour materials 2 are inserted. Sheath 3 has an inside diameter sufficiently larger than the outside diameter of armour materials 2 that a space 4 is formed between the armour materials 2 and said sheath 3. Cooling air is introduced into said space 4 from one end of said fibers 1 through an appropriate cooling apparatus 7.

In this structure, although said fibers 1 develops heat by transmitting highpower laser rays therethrough, heat developed is radiated through said heat conductive armour materials 2. Fibers 1 are effectively cooled by cooling air introduced into said space 4 with said armour materials 2 as the cooling medium. Further, although said fibers 1 sometimes develop heat locally, the locally developed heat is diffused fast through said heat conductive materials 2 and the distribution of heat is averaged. This leads to the resolution of the local destruction owing to the local development of heat.

Further, although metal nets are used for said armour materials 2 in the preferred embodiment as shown in FIG. 1, other heat conductive materials may be used regardless of their quality or shape of the material.

Figure 2:
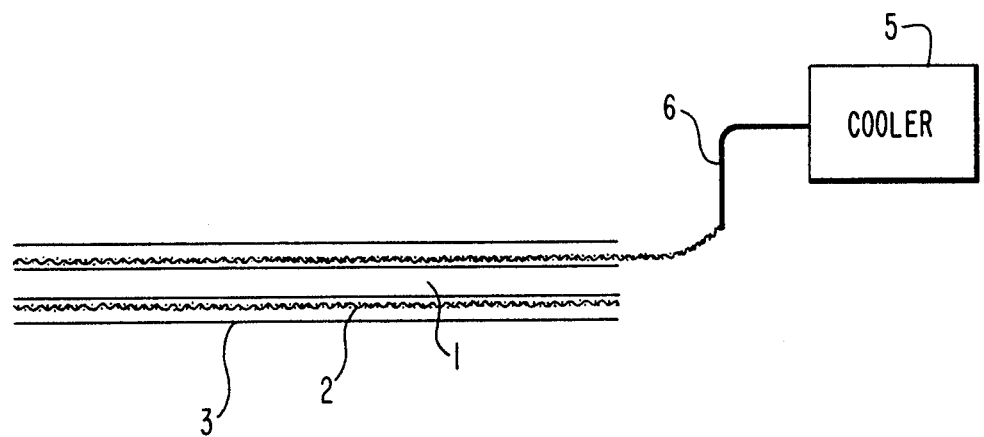
FIG. 2 is a side sectional view showing another preferred embodiment of a mechanism for cooling optical fibers according to the present invention.

Referring now to FIG. 2 showing another preferred embodiment of the present invention, metal nets 2 are wound with said sheath 3 almost compactly. On the other hand, one end of said metal nets 2 is connected with a cooler 5 through a heat conductive metal wire 6. According to the present preferred embodiment, heat developed in said fibers 1 is transmitted to said cooler 5 through said metal nets 2 to be absorbed. Consequently, heat developed in said fibers 1 is effectively radiated and diffused since said metal nets 2 also act as the cooling medium in this preferred embodiment. In addition, although said metal nets 2 is connected with a cooler, connection with the earth is similarly effective.

As described above, according to a mechanism for cooling optical fibers of the present invention, heat developed from optical fibers can be effectively radiated and diffused using such a simple structure that optical fibers are wound with heat conductive materials and thereby the span of life of optical fibers can be lengthened at a comparatively low production cost. Further, an accident such as a fire or the like can be avoided since the temperature rise due to the development of heat can be prevented. In addition, the cooling mechanism of the present invention is safe and simple in operation.

What is claimed is:

1. A mechanism for cooling optical fibers, comprising:
    at least one infrared light transmitting optical fiber;
    metal netting wound about said at least one fiber to conduct heat from said at least one fiber; and
    a sheath, said at least one fiber on the periphery thereof and said netting being inserted in said sheath, said sheath and said netting being spaced so as to permit cooling air to flow therebetween to cool said at least one fiber.

2. A mechanism as in claim 1, wherein said netting is wound in direct contact with the periphery of said at least one fiber.

3. A mechanism as in claim 1, further comprising means for introducing cooling air between said sheath and said netting at one end of said at least one fiber.

4. A mechanism as in claim 3, wherein said netting is would in direct contact with the periphery of said at least one fiber.

5. A mechanism for cooling optical fibers, comprising:
    at least one infrared light transmitting optical fiber;
    metal netting wound about said at least one fiber on the periphery thereof to conduct heat from said at least one fiber;
    a sheath, said at least one fiber and said netting being inserted in said sheath;
    a cooler; and
    a heat conductive element connecting said cooler to said netting so that heat in said at least one fiber is drawn to said cooler through said netting and element to cool said at least one fiber.

6. A mechanism as in claim 5, wherein said netting is wound in direct contact with the periphery of said at least one fiber.

7. A mechanism as in claim 3, wherein said element comprises a metal wire connected at opposite ends to said netting and said cooler so that heat flows in said wire to said cooler.

8. A mechanism as in claim 7, wherein said netting is wound in direct contact with the periphery of said at least one fiber.